(12) United States Patent  
Ramachandra

(10) Patent No.: US 7,940,181 B2  
(45) Date of Patent: May 10, 2011

(54) RFID BASED PRODUCT LEVEL AVAILABILITY

(75) Inventor: Girish A. Ramachandra, Bangalore (IN)

(73) Assignee: Infosys Technologies Ltd., Bangalore (IN)

( * ) Notice: Subject to any disclaimer, the term of this patent is extended or adjusted under 35 U.S.C. 154(b) by 321 days.

(21) Appl. No.: 12/023,682

(22) Filed: Jan. 31, 2008

(65) Prior Publication Data

US 2008/0186167 A1 Aug. 7, 2008

(30) Foreign Application Priority Data

Feb. 1, 2007 (IN) .............................. 238/HCE/2007

(51) Int. Cl.
*G08B 13/14* (2006.01)

(52) U.S. Cl. ................ 340/572.1; 340/572.2; 340/572.3; 340/572.4; 340/568.8; 235/375; 235/376; 235/377; 235/380; 235/385; 700/226; 700/236; 705/16; 705/22; 705/29; 705/414; 705/417

(58) Field of Classification Search ................ 340/572.1, 340/568.8, 612, 615, 626, 5.92; 705/16, 705/22, 28, 29, 414–417; 700/225, 236, 700/243–244, 215, 217, 221; 235/285, 375–385
See application file for complete search history.

(56) References Cited

U.S. PATENT DOCUMENTS

| 6,467,649 | B1 * | 10/2002 | Ullman et al. | ................ | 221/192 |
| 7,081,818 | B2 | 7/2006 | Eckstein et al. | | |
| 7,233,241 | B2 | 6/2007 | Overhultz et al. | | |
| 2006/0022823 | A1 * | 2/2006 | Ryal | .......................... | 340/572.1 |
| 2006/0279412 | A1 * | 12/2006 | Holland et al. | ............ | 340/10.51 |
| 2008/0116262 | A1 * | 5/2008 | Majer | .......................... | 235/381 |

OTHER PUBLICATIONS

Wikipedia, "Radio-frequency identification," <http://en.wikipedia.org/w/index.php?title=Radio-frequency_identification&printable=yes>, 27 pages. (accessed Jan. 22, 2008).

* cited by examiner

*Primary Examiner* — George A Bugg  
*Assistant Examiner* — Ojiako Nwugo  
(74) *Attorney, Agent, or Firm* — Klarquist Sparkman, LLP

(57) ABSTRACT

Product availability can be determined using radio frequency identification (RFID) by determining whether a RFID tag is detectable by a RFID reader and setting a product availability condition, where the RFID tag is not attached to the product, and where distance between the RFID tag and the RFID reader changes as quantity of the product changes. A system for determining availability of products using RFID can comprise a product display unit, a RFID reader, a RFID tag associated with the product display unit, and a computing device configured to set product availability conditions. In the system, distance between the RFID tag and the RFID reader changes as quantity of the product changes.

21 Claims, 11 Drawing Sheets

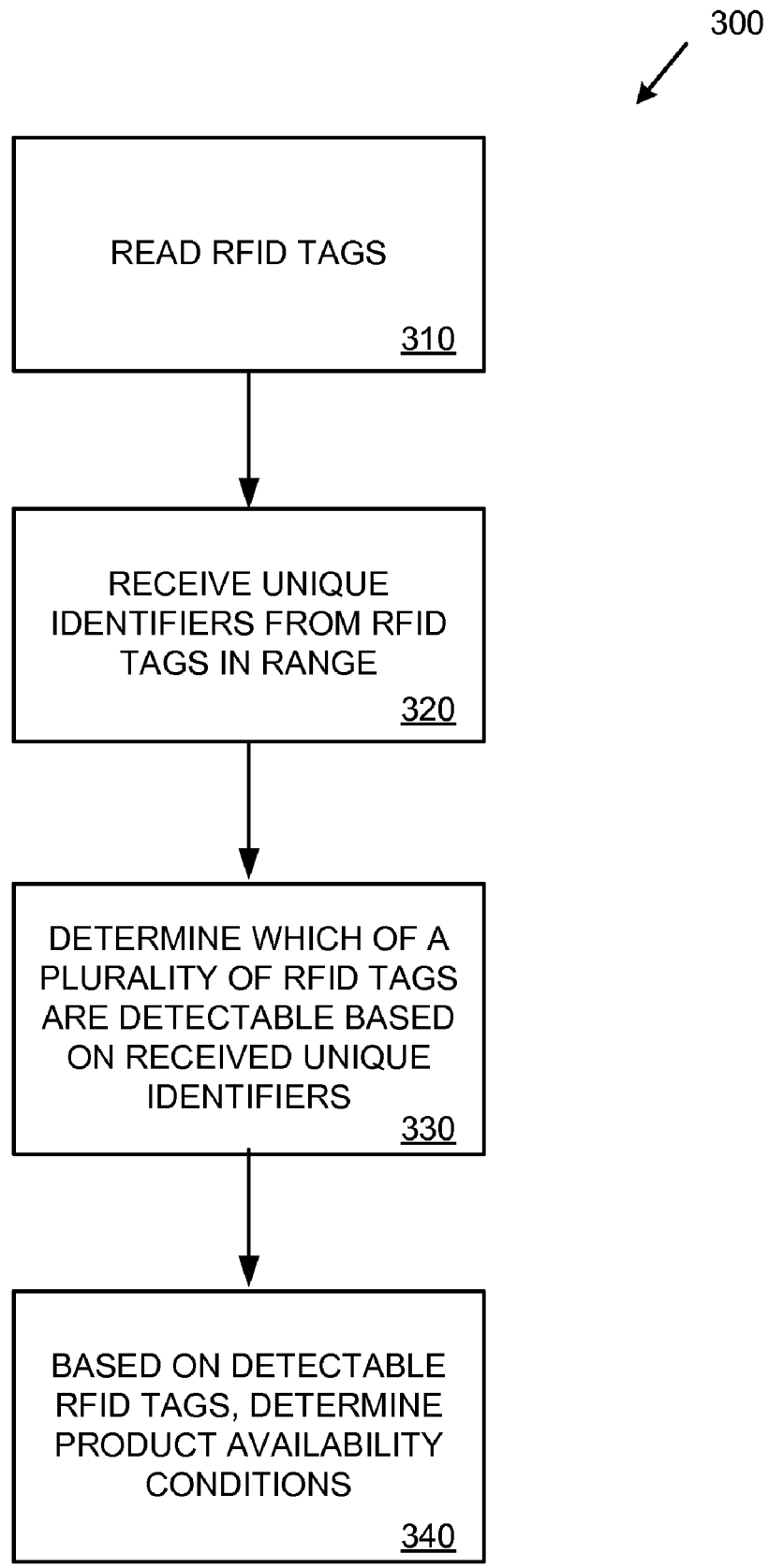

RFID BASED PRODUCT LEVEL AVAILABILITY

BACKGROUND

Radio frequency identification (RFID) is an Automatic Identification and Data Capture (AIDC) method that enables automatic identification of objects. RFID based track and trace systems typically employ tagging of items and assets at various levels of granularity, such as individual items, boxes, cases, pallets, etc. There are many application scenarios that require tagging at an individual item level, but the relatively high cost of RFID tags can be an obstacle to wide spread implementation, especially for low value items. As a result, the high cost of RFID tags can render tagging of many low value products economically unviable.

RFID technology has been applied to various product tracking scenarios. For example, smart shelves exist that can identify RFID-tagged objects placed on the shelf. While tagging individual objects, or groups of objects, with RFID tags can be useful for tracking and identification purposes, it can also be costly, and problematic with some types of objects. For example, metal objects (e.g., a metal soda can) can interfere with RFID reception and transmission. Similarly, bottles of liquid, such as a plastic bottle of water, can also interfere with RFID communication.

Therefore, there exists ample opportunity for improvement in technologies related to determining RFID-based product availability.

SUMMARY

A variety of technologies related to RFID-based product availability can be applied. In general, the technologies described herein relate to determining product level availability (e.g., tracking product inventory levels) using RFID (e.g., at a pre-determined on/off detection point).

For example, product availability (e.g., inventory levels) of products on a product display unit can be determined using RFID by determining whether a RFID tag is detectable by a RFID reader, and setting a product availability condition based on the determination, where the product availability condition indicates product availability of a product on the product display unit. Product availability can be determined where the RFID tag is not attached to the product, and where distance between the RFID tag and an antenna of the RFID reader changes as quantity of the product on the product display unit changes (e.g., the RFID tag is located closer to the antenna of the RFID reader when there is a greater quantity of the product on the product display unit and farther away when there is a lesser quantity of product on the product display unit).

A product display system can determine availability of products using RFID. The system can comprise a product display unit configured to hold a quantity of a product, a RFID reader, a RFID tag associated with the product display unit (and not attached to the product), and a computing device. The distance between the RFID tag and an antenna of the RFID reader changes as quantity of the product on the product display unit changes (e.g., the RFID tag moves closer to the antenna of the RFID reader as quantity of the product is added to the product display unit and farther from the antenna of the RFID reader as quantity of the product is removed from the product display unit). The RFID reader determines whether the RFID tag is detectable by the reader. The tag is detectable if it is within a pre-configured detection range of the antenna of the reader.

A product display system can determine product availability of products on shelving units using RFID. The system comprises a shelving unit configured to hold products in rows and a plurality of RFID tags associated with the shelving unit, where each RFID tag travels along its corresponding row. The system also comprises a RFID reader for determining which of the plurality of RFID tags are detectable (e.g., whether the plurality of tags are within a pre-configured detection range of an antenna of the reader). The system can also comprise a computing device configured to set one or more product availability conditions.

The foregoing and other features and advantages will become more apparent from the following detailed description, which proceeds with reference to the accompanying figures.

BRIEF DESCRIPTION OF THE DRAWINGS

FIG. 3 is a flowchart showing an exemplary method for determining product availability using a plurality of RFID tags.

DETAILED DESCRIPTION OF EXEMPLARY EMBODIMENTS

EXAMPLE 1

Exemplary Products

Figure 1:
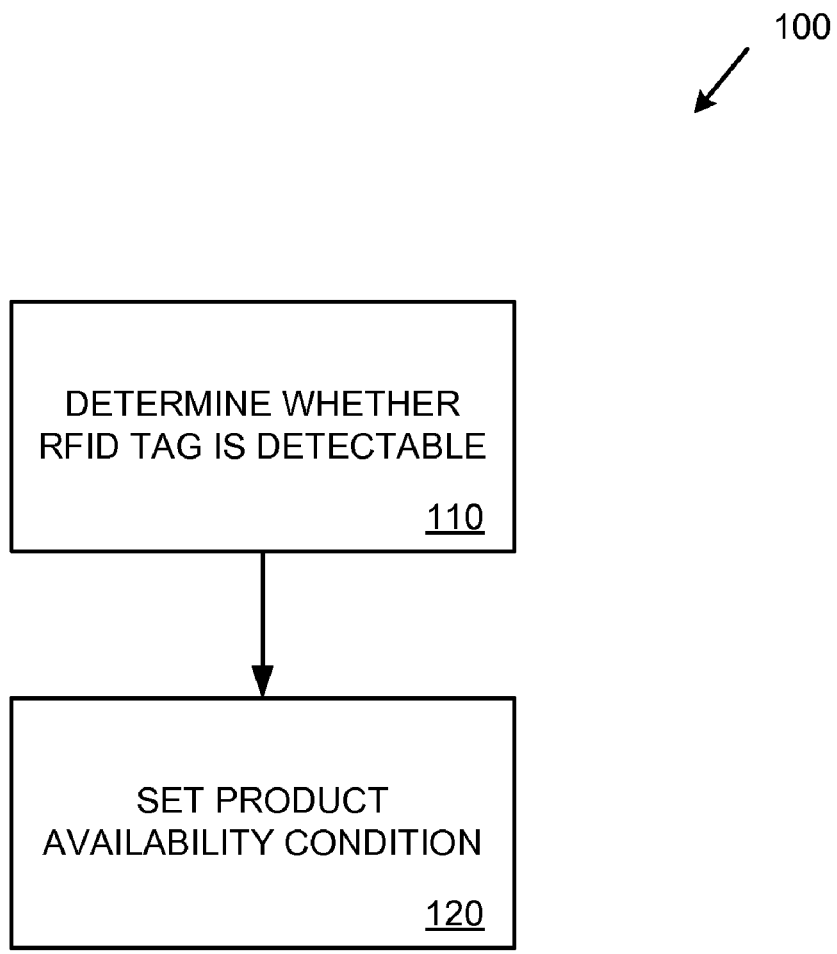
FIG. 1 is a flowchart showing an exemplary method for determining product availability using RFID.

In any of the examples herein, products include objects (e.g., items) that are bought, sold, or exchanged. For example, a product can be a retail product sold in a store (e.g., a can of soda or a box of cereal). A product can be a food item (e.g., sold in a grocery store) or a non-food item (e.g., flat-screen television sold in an electronics store).

Products can be stored in a product display unit. For example, cans of soda can be stored on a shelving unit in a grocery store.

EXAMPLE 2

Exemplary Radio Frequency Identification (RFID)

In any of the examples herein, radio frequency identification (RFID) is a technology used to identify or detect RFID tags using radio frequency signals. In general, RFID uses a RFID reader (comprising an antenna) to communicate with RFID tags. Using RFID communication, a RFID reader can transmit a signal and receive information from RFID tags (e.g., information such as a unique identification code or number of the RFID tag). The RFID reader transmits and receives using an antenna of the RFID reader (e.g., an integrated antenna or a separate antenna connected to the reader).

EXAMPLE 3

Exemplary RFID Reader

In any of the examples herein, a RFID reader can be used to detect and identify RFID tags. RFID readers generate a radio frequency field which is received by RFID tags within range. In response to the radio frequency field generated by RFID readers, RFID tags transmit a response.

In order to generate the radio frequency field, a RFID reader uses an antenna. A reader's antenna can be an integral part of the reader, or it can be a separate component. One RFID reader can be connected to one or more antennas.

RFID readers are capable of detecting RFID tags within range. The detection range of RFID readers depends on a number of factors (e.g., antenna design, power level, and tag type). Detection range also depends on characteristics of the RFID tags (e.g., antenna configuration of the tags).

EXAMPLE 4

Exemplary RFID Tag

In any of the examples herein, a RFID tag can be used as an indicator of product availability where the RFID tag is not attached to a product. Product availability can be determined based on whether a RFID tag is detectable by a RFID reader.

In a specific implementation, passive RFID tags are used. Passive RFID tags have a number of advantages. For example, passive tags are cheaper than active or semi-active tags. While passive tags have a shorter range, in situations involving product display units (e.g., shelving units), a longer detection range is typically not required.

EXAMPLE 5

Exemplary Detection Range

In any of the examples herein, the detection range of a RFID reader can be configured (e.g., pre-configured). For example, a RFID reader and RFID tag combination can be configured such that the RFID tag is detectable by the RFID reader only when the tag is within a specific distance of the RFID reader (e.g., a specific number of inches or feet), and otherwise the tag is not detectable. Configuring such a detection range can be accomplished using specific antennas (on the reader and tag) and a specific transmission power level for the reader. Other configuration parameters can also affect detection range.

Detection range can be set by a manufacturer. For example, a manufacturer can pre-configure the detection range of a product display unit comprising one or more RFID tags and one or more RFID readers.

EXAMPLE 6

Exemplary Product Display Unit

In any of the examples herein, a product display unit is something that holds products, such as a shelf, rack, dispenser, tray, shelving unit, promotional display, product dispenser, etc. A product display unit can be located in a store or in another type of location, such as a warehouse.

Products can be added to a product display unit. For example, a quantity of a product (e.g., a number of bottles of soda) can be added to a retail store shelf (e.g., bottles of soda can be stocked on a shelf for sale to customers).

Products can be removed from a product display unit. For example, a quantity of a product (e.g., a number of bottles of soda) can be removed from a retail store shelf (e.g., some bottles of soda can be removed by a customer for purchase).

A product display unit can hold a quantity of a specific product (e.g., the product display unit can be dedicated to holding only cans of a specific brand of soda).

A product display unit can be configured to hold a number of different products. For example, a product display unit can have a number of shelves, each shelf holding a different type of cereal.

RFID tags can be used to help determine the status of product on a product display unit. For example, a RFID tag can be used to determine various conditions (e.g., product out-of-stock, product in-stock, less than a set quantity of a product remaining, etc.) relating to the availability of the product.

In the technologies and examples described herein, the RFID tags used to determine product availability are not attached to the product. Instead of being attached to the product, the RFID tags are associated with the product display unit (e.g., the tags can be pre-installed in the product display unit). In a specific implementation, one RFID tag is used for each row of a shelving unit. Because the RFID tags are associated with the product display unit, each product item does not require an RFID tag. While product does not have to be RFID tagged, the technologies and examples described herein still operate with product that has been RFID tagged (e.g., the tags on the product are ignored).

A RFID tag can be associated with the product display unit by physically attaching the RFID tag to the product display unit (e.g., attaching the RFID tag a movable spring system, piston, conveyor, etc.). The RFID tag can also be associated with the product display unit in other ways, and the RFID tag does not have to be physically attached to the product display unit to be associated with the product display unit. For example, the RFID tag can be incorporated into a separate item that follows product (e.g., soda cans) down a gravity-feed system.

EXAMPLE 7

Exemplary Product Availability

In any of the examples herein, RFID can be used to determine product availability (e.g., used to determine product availability conditions). Determining product availability is based on detection of RFID tags.

In a specific implementation, a RFID tag moves closer to a RFID reader as quantity of product is added (e.g., added to a product display unit), and the RFID tag moves farther from the RFID reader as quantity of product is removed. By configuring the detection range to correspond to a specific quantity of product remaining (e.g., a full shelf, an empty shelf, or a specific quantity), product availability can be determined.

For example, a product display unit can be designed such that when products are added to the shelving unit, they push a RFID tag closer to a RFID reader (closer to the RFID reader's antenna), and when products are removed from the shelving unit the RFID tag is pushed farther away from the RFID reader (farther away from the RFID reader's antenna). Such a design can be accomplished, for example, using a spring-loaded pusher with the RFID tag fixed to the end of the pusher.

Alternatively, a RFID tag can move farther away from a RFID reader as quantity of product is added and closer from the RFID reader as quantity of product is removed. Such an alternative arrangement can be accomplished, for example, by placing the RFID reader (e.g., the antenna of the RFID reader) in a different location (e.g., at the front of a shelving unit instead of at the back).

EXAMPLE 8

Exemplary Method for Determining Product Availability

FIG. 1 shows an exemplary method 100 for determining product availability of products (e.g., on a product display unit) using RFID. At 110, a determination is made regarding whether a RFID tag is detectable by a RFID reader (detectable by the reader's antenna or antennas). In a specific implementation, the tag is detectable by the reader when the tag is within a pre-configured detection range of the reader (e.g., pre-configured at the factory or pre-configured on-site at a retailer). For example, the pre-configured detection range can be set such that the tag is detectable (e.g., in-field) only when a product display unit is full. If any quantity of product is removed from the shelf, the tag is not detectable (e.g., out-of-field).

The pre-configured detection range can correspond to a pre-determined quantity of product. For example, the pre-configured detection range can correspond to a position on a shelf (e.g., a specific number of inches or feet away from a RFID reader) that corresponds to a specific number of the product on the shelf (e.g., four cans of soda).

The pre-configured detection range can correspond to the presence or absence of product. For example, the pre-configured detection range can correspond to a position on a shelf between empty and one quantity of product. If the RFID tag is detectable, then there is still at least one item of product left. When the last item of a product is removed (e.g., when the last can of soda is removed from a shelving unit row), the RFID tag is no longer detectable.

Because detection of the RFID tag by the RFID reader occurs at a specific location, the combination can operate as a limit switch. Based on the proximity of the RFID tag to the RFID reader (to the reader's antenna), the reader may or may not detect the tag.

At 120, a product availability condition is set based on the determination of whether the RFID tag is detectable by the RFID reader 110. The product availability condition can indicate various conditions depending on where the detection range of the RFID reader is set. For example, the detection range can be set such that the RFID tag is detectable when there is any quantity (i.e., at least one) of the product remaining, and the tag is not detectable when there is no quantity remaining. The detection range can also be set such that the RFID tag is only detectable when a product display unit (e.g., a shelving unit) is full, and once product is removed, the tag is no longer detectable. The detection range can be set such that the RFID tag is detectable when there is more than a specific quantity of product remaining and not detectable when there is less than or equal to the specific quantity (e.g., detectable when there are greater than four cans of soda remaining and not detectable when there are three or fewer cans remaining).

The product availability conditions can indicate inventory levels. For example, if a product availability condition indicates that a shelving unit is full, then an inventory level can be set indicating a quantity of product remaining on the shelf, where the quantity of product corresponds to a full shelving unit.

Figure 2:
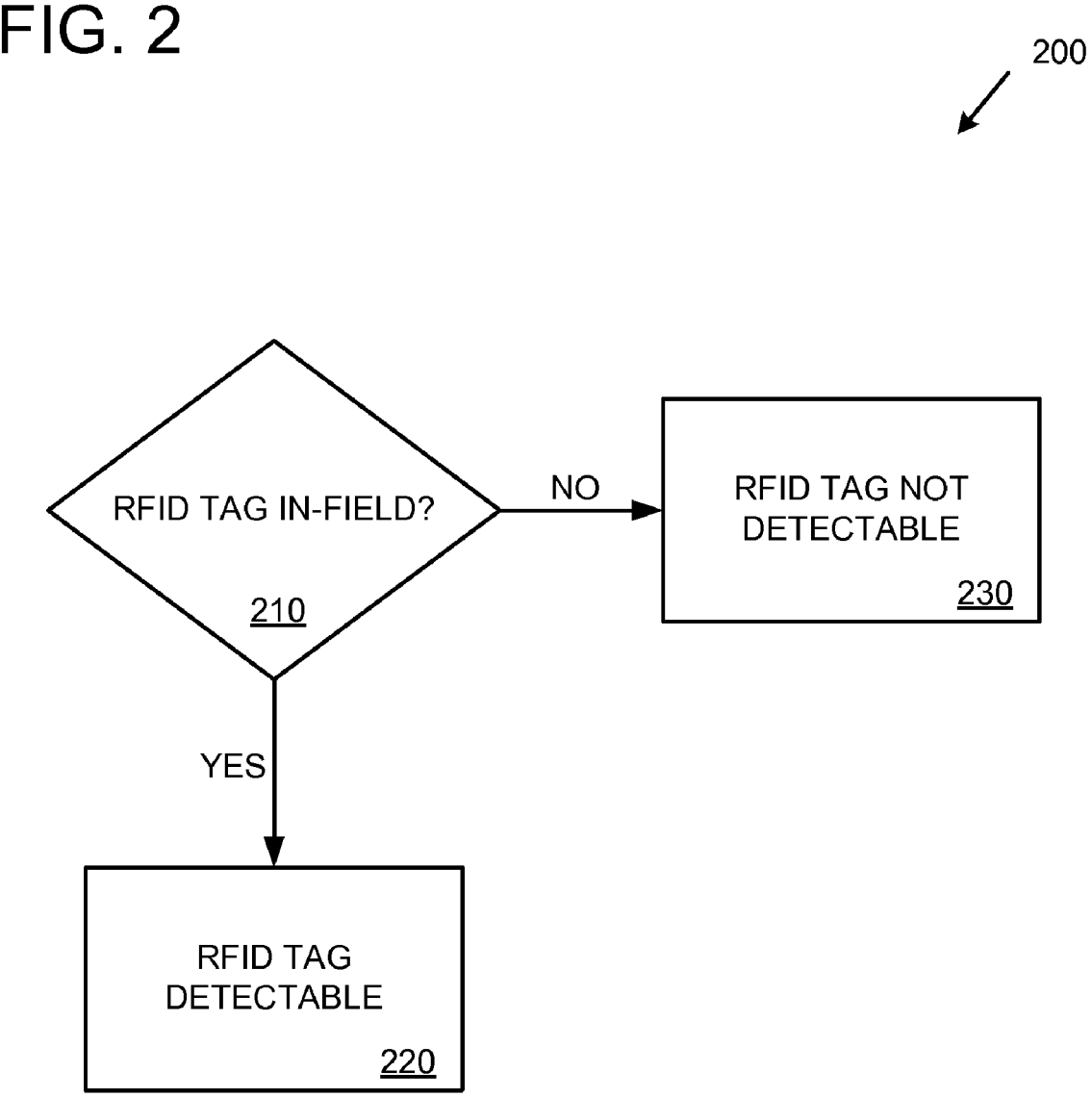
FIG. 2 is a flowchart showing an exemplary method for determining whether a RFID tag is detectable by a RFID reader.

FIG. 2 shows an exemplary method 200 for determining whether a RFID tag is detectable by a RFID reader. At 210, the RFID reader checks whether the RFID tag is in-field (e.g., if the RFID tag is in-field, it will transmit a response to the RFID reader). If the RFID tag is in-field, then the RFID tag is detectable 220. If the RFID tag is not in-field (i.e., the RFID tag is out-of-field), then the RFID tag is not detectable 230.

The location at which the RFID tag transitions from detectable to not detectable (e.g., in-field to out-of-field) can be set by configuring a detection range of a RFID reader (e.g., based on antenna design of the reader and tag, as well as power levels).

EXAMPLE 9

Exemplary Method for Determining Product Availability Using a Plurality of RFID Tags FIG. 3 shows an exemplary method 300 for determining product availability of products (e.g., on a product display unit) using a plurality of RFID tags. At 310, one or more RFID readers attempt to detect a plurality of RFID tags. In a specific implementation, a single reader attempts to detect a plurality of RFID tags, each tag corresponding to a different row of a shelving unit.

At 320, the RFID reader receives a response from the RFID tags that are in range (e.g., within a pre-configured detection range of the reader). Of the plurality of RFID tags, none, some, or all may be detectable at any specific time. The response from each detectable RFID tag includes a unique identification number (e.g., unique identification codes) of the RFID tag.

At 330, a determination is made regarding which of the plurality of RFID tags are detectable based on the received unique identification numbers. In a specific implementation, the unique identification numbers of all RFID tags present on a shelving unit are maintained (e.g., by a computing device). When the unique identification numbers from the detected tags are received 320, they are compared with all the unique identification numbers present on the shelving unit. From the comparison, the specific tags that are detectable, and the specific tags that are not detectable, can be determined.

At 340, product availability conditions are determined based on which RFID tags of the plurality of RFID tags are detectable 330. For example, if the plurality of RFID tags correspond to a plurality of rows of a shelving unit, a plurality of corresponding product availability conditions can be set, one for each row (e.g., indicating which rows are full, which rows have less than a specific quantity of product remaining, or which rows are empty). From a number of product availability conditions, an overall condition can be set (e.g., indicating that a shelving unit has sufficient stock, is low on stock, or needs to be restocked with product).

EXAMPLE 10

Exemplary System for Detecting RFID Tags

Figure 4A:
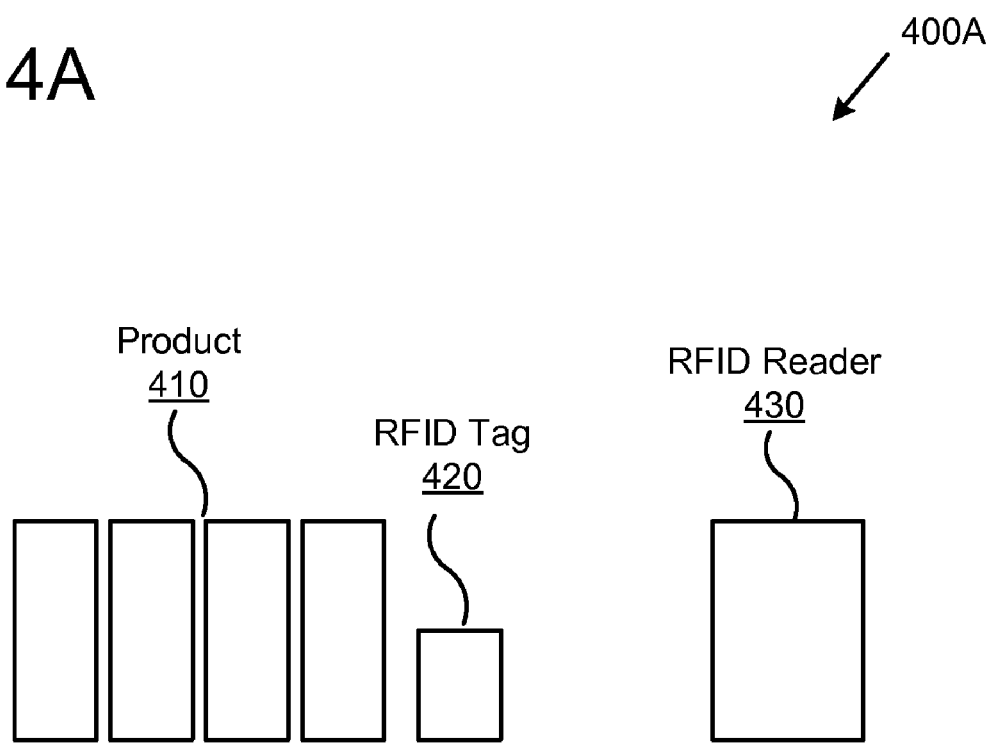
FIG. 4A is a diagram showing a schematic view of a system for determining product availability using RFID.

FIG. 4A is an exemplary diagram 400A diagram showing a schematic view of a system for determining product availability using RFID. The diagram 400A is a side view. In the diagram 400A, a RFID tag 420 is positioned between a quantity of a product 410 and a RFID reader 430 (comprising an antenna located with the reader). The diagram 400A can represent product on a product display unit (e.g., on a row of a shelving unit). In the diagram 400A, the RFID tag 420 is not attached to the product 410.

As more product is added, the RFID tag 420 moves closer to the RFID reader 430 (and thus closer to the RFID reader's antenna). As product is removed, the RFID tag 420 moves farther from the RFID reader 430 (and thus farther from the RFID reader's antenna). Therefore, when there is a greater quantity of product 410, the RFID tag 420 is closer to the RFID reader 430 than when there is a lesser quantity of product 410.

In an alternative configuration, the RFID reader 430 can be in a different position (e.g., to the left of the product 410 in diagram 400A). In such a position, the RFID tag 420 would move closer to the reader as product is removed and farther from the reader as product is added.

In order to determine product availability, the RFID reader 430 determines whether the RFID tag 420 is detectable (e.g., whether the RFID tag 420 is in-field or out-of-field of the RFID reader 430). In a specific implementation, the RFID tag 420 responds with its unique identification number, which is read by the RFID reader 430 when the RFID tag 420 is in range (e.g., within a pre-detection range of the RFID reader 430).

In a specific implementation, the product 410 is untagged (there are no RFID tags attached to the product 410). However, the technologies and examples described herein still operate if the quantity of product 410 is RFID tagged (e.g., the tags on the product can simply be ignored, or tags on the product can be used in combination with the technologies and examples described herein).

Figure 4B:
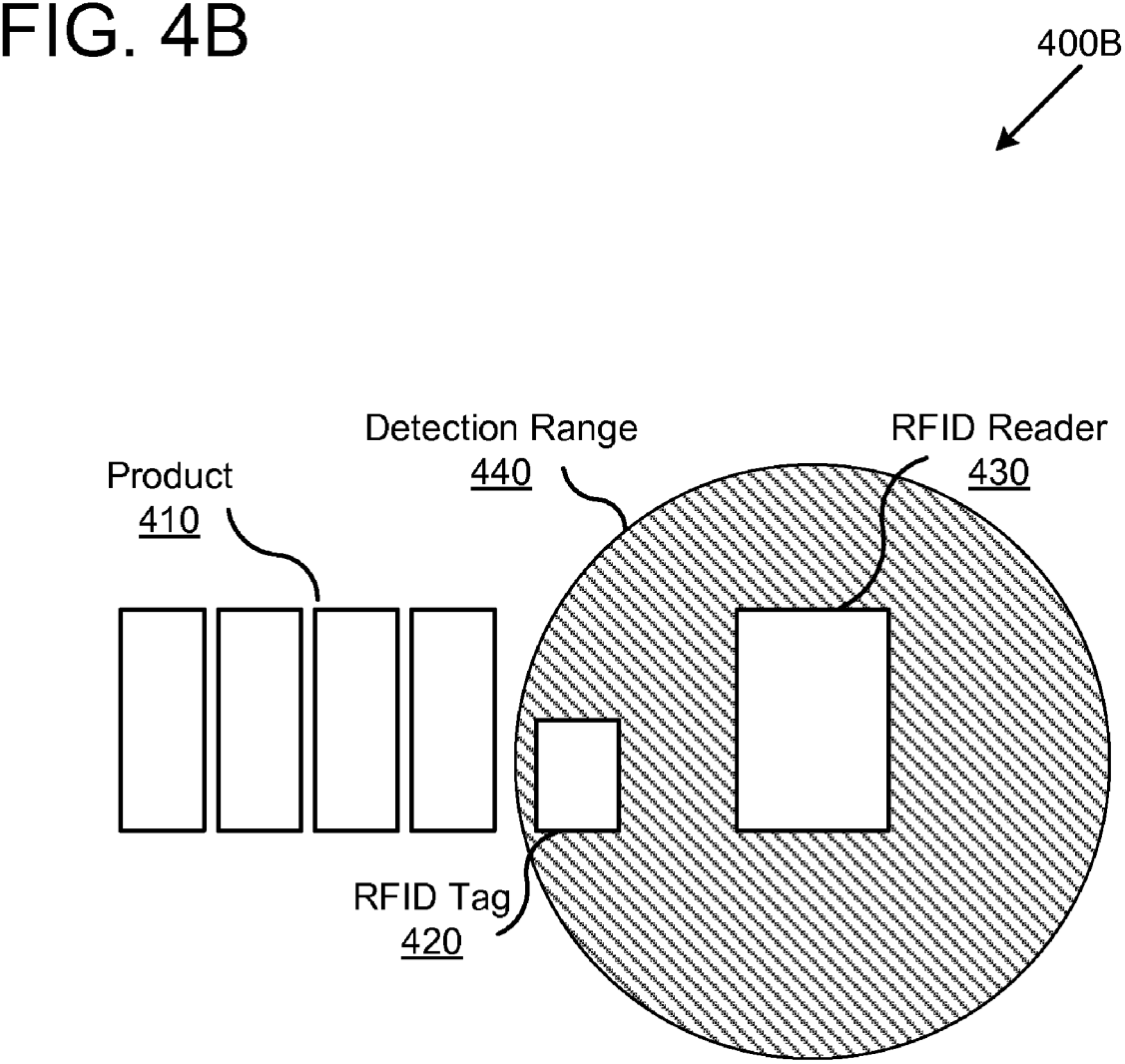
FIG. 4B is a diagram showing a schematic view depicting the detection range of a RFID reader and a detectable RFID tag.

FIG. 4B is an example diagram 400B (corresponding to diagram 400A) showing the detection range 440 of the RFID reader 430. The detection range 440 is determined, at least in part, by the antenna design and power level of the reader 430. As depicted in the diagram 400B, when there are four items of product 410 (e.g., four boxes of cereal on a shelving unit row), the RFID tag 420 is detectable by the RFID reader (e.g., it is in-field). For example, based on a determination that the RFID tag 420 is detectable by the RFID reader 430, a product availability condition can be set indicating that the quantity of product 410 is at least four (e.g., that there are at least four boxes of cereal on a shelving unit row).

Figure 4C:
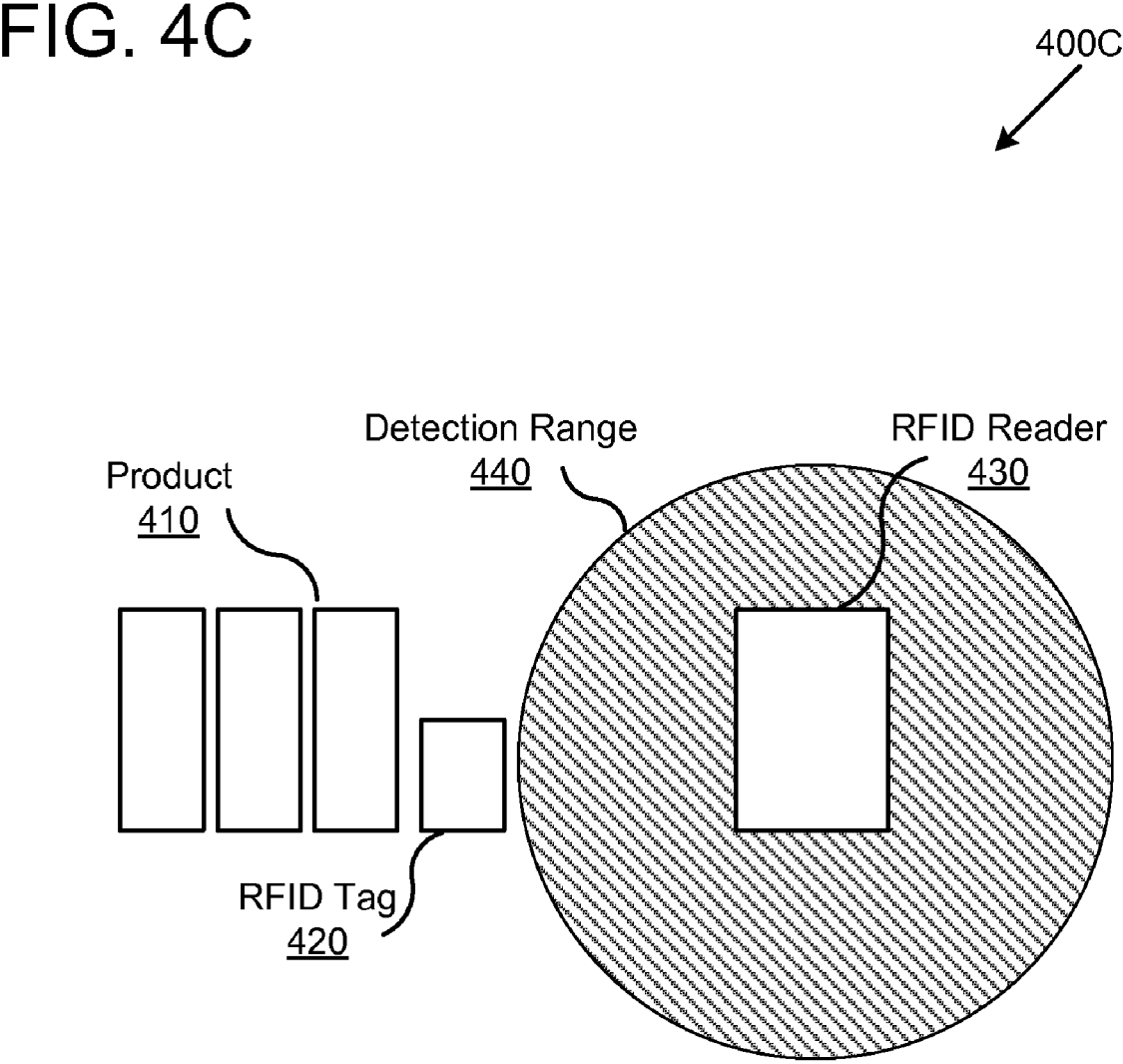
FIG. 4C is a diagram showing a schematic view depicting the detection range of a RFID reader and an undetectable RFID tag.

FIG. 4C is an example diagram 400C (corresponding to diagram 400A) showing the detection range 440 of the RFID reader 430. As depicted in the diagram 400C, when there are three items of product 410 (e.g., three boxes of cereal on a shelving unit row), the RFID tag 420 is not detectable by the RFID reader 430 (e.g., it is out-of-field). In diagram 400C, one item of product (one quantity) 410 has been removed (e.g., one box of cereal has been removed from a shelving unit row). For example, based on a determination that the RFID tag 420 is not detectable by the RFID reader 430, a product availability condition can be set indicating that the quantity of product 410 is less than four (e.g., three or fewer boxes of cereal remaining on a shelving unit row).

In diagrams 400B and 400C, the detection range 440 of the RFID reader 430 has been pre-configured such that the RFID tag 420 is detectable by the RFID reader 430 when there is a quantity of four of the product 410 and not detectable when there is a quantity of three of the product 410. For example, this detection range 440 allows a product availability condition to be set indicating whether a shelving unit row currently holds a quantity of four or more of the product, or currently holds a quantity of three or less of the product.

Instead of a pre-configured detection range distinguishing between three and four of the product, a different detection range can be pre-configured. For example, the detection range can be pre-configured such that the RFID tag 420 is only detectable when a shelving unit row is full (e.g., allowing a product availability condition to be set indicating whether the shelving unit row is full or not full).

EXAMPLE 11

Exemplary System for Determining Product Availability

Figure 5:
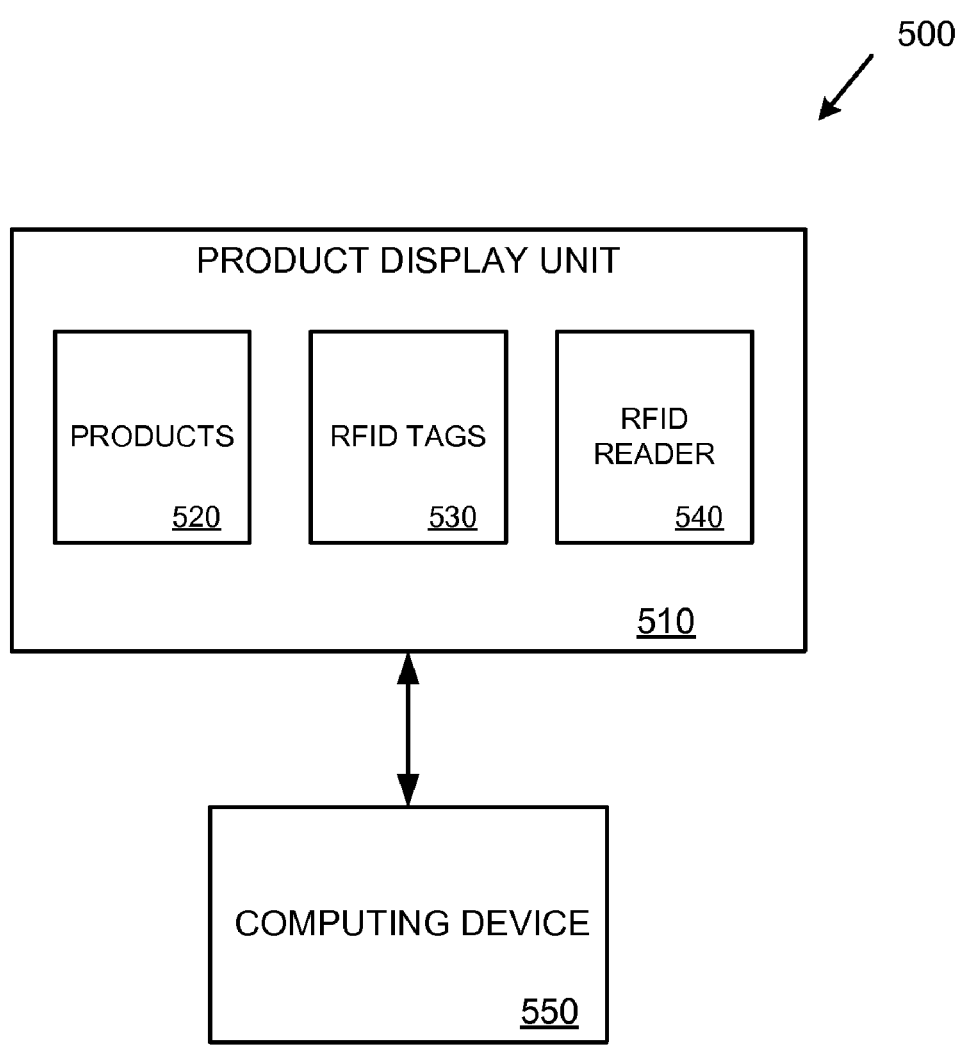
FIG. 5 is a diagram showing an exemplary system for determining product availability based on detection of RFID tags.

FIG. 5 shows an exemplary system 500 for determining product availability based on detection of RFID tags. The system 500 includes a product display unit 510. The product display unit 510 is configured to hold products 520 (e.g., a quantity of the same product, such as a specific brand of soda, or quantities of different products, such as different brands of cereal). For example, the product display unit 510 can be a shelving unit (or more than one shelving units) with one or more rows configured to hold a quantity of a product in each row (e.g., a shelving unit configured to hold a number of rows of cereal boxes).

The product display unit 510 includes one or more RFID tags 530. The one or more RFID tags 530 are associated with the product display unit 510. While the RFID tags 530 are not attached to the products 520 themselves, the RFID tags 530 move when quantity of the product is added to, or removed from, the product display unit 510. In a specific implementation, the RFID tags 530 are movably attached to the product display unit 510 (e.g., the RFID tags 530 can be attached to the end of spring systems that push the products 520 toward the front of the product display unit 510).

Because the RFID tags 530 are associated with the product display unit 510, and not attached to the products 520, only a fixed number of RFID tags 530 are needed regardless of the quantity of the products 520 that are added to, or removed from, the product display unit 510. RFID tags are not needed on the products 520.

The system 500 includes a computing device 550. The computing device 550 can be a computer (e.g., laptop, desktop, or server computer), a specialized computing device (e.g., hardware and/or software customized for tracking product availability), or another type of computing device. The computing device 550 can be configured to set product availability conditions indicating availability of the products 520 on the product display unit 510. For example, the computing device 550 can receive information from the RFID reader 540 indicating which of the RFID tags 530 are detectable. From the received information, the computing device 550 can set product availability conditions (e.g., set conditions for each of a number of rows of product indicating whether the row is full or not, empty or not, whether there is more than a specific quantity of product remaining on the row, or whether there is less than a specific quantity of product remaining on the row).

The computing device 550 can be integrated with the product display unit 510 or located remotely. For example, the computing device 550 can be a centralized server system of a business (e.g., a store) that tracks product availability of products on a number of product display units.

The computing device 550 can use information generated from the product display unit 510 (e.g., product availability conditions) to generate events (e.g., an out-of-stock event) that can be communicated to an in-store network (e.g., an in-store mesh network). For example, the computing device 550 can participate in an in-store network using a standard networking protocol (e.g., TCP/IP). The in-store network can track product availability of a number of product display units and alert staff to various conditions (e.g., send an alert message to a staff person that a specific product display unit needs to be restocked).

The computing device 550 can also be used to provide other functionality. For example, the computing device 550 can provide a user interface for setting various configuration parameters. An example user interface is a user interface allowing a retailer to enter a specific detection range. Setting a specific detection range can allow for a change in product size (e.g., to allow for detection of the same quantity of larger cereal boxes) or a change in detection position (e.g., to change from an empty/not empty detection point to a full/not full detection point). Another example user interface is a user interface allowing a retailer to configure various events. For example, the user interface can allow the retailer to set an alert event (e.g., an out-of-stock event) if more than two out of four rows of a shelving unit are less than half full (e.g., where product availability conditions have been set for more than two of the rows indicating less than half full).

EXAMPLE 12

Exemplary Shelving Unit

Figure 6:
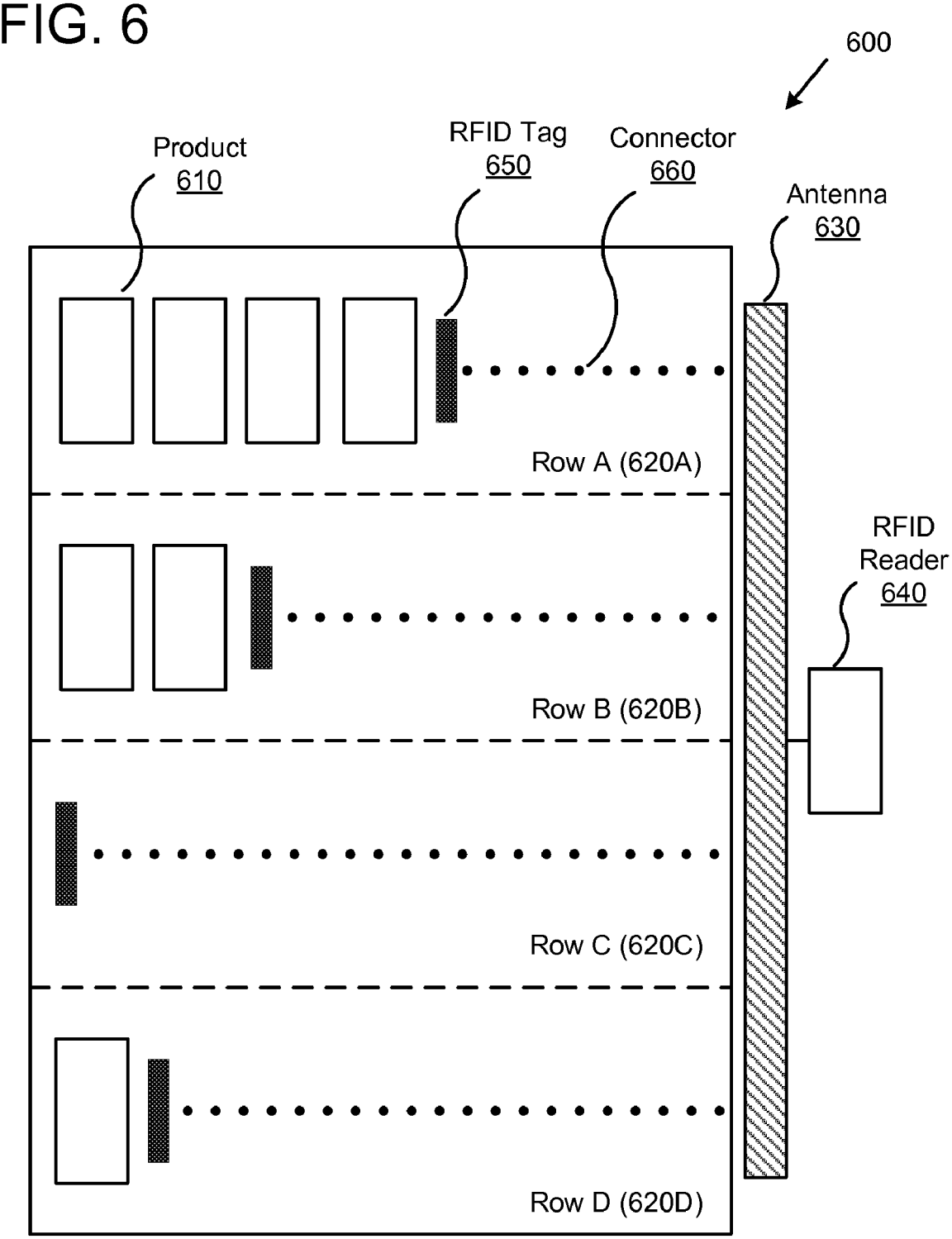
FIG. 6 is a diagram showing a schematic view depicting a shelving unit.

FIG. 6 is an exemplary diagram 600 showing a schematic view of a shelving unit for determining availability of products using RFID. In the diagram 600, the shelving unit has four rows 620A-D. Each row holds a quantity of a product. For example, Row 620A holds four items of product 610 (e.g., four boxes of cereal or four cans of soda). Row 620B holds two items, row 620C is empty, and row 620D holds one item.

Each row includes a RFID tag (e.g., RFID tag 650 of Row 620A). Each RFID tag can be identified by its unique identification number. Each RFID tag moves forward and backward along its row as product is added to, and removed from, the row. For example, RFID tag 650 moves toward the front of the shelving unit as product is removed and toward the back of the shelving unit as product is added. The RFID tags move along their respective rows in various ways (e.g., spring systems, gravity, chute, piston, conveyor, etc.). In the diagram 600, the RFID tags are connected to the shelving unit (e.g., RFID tag 650 is connected to the shelving unit via connector 660). The connector 660 can be, for example, a spring or a piston. In some implementations, the connector 660 is not present (e.g., in a gravity feed system).

The shelving unit includes an antenna 630 connected to a RFID reader 640. The RFID reader 640 determines whether the RFID tags are detectable (are detectable by the antenna 630 connected to the reader 640). The RFID reader 640 can determine which RFID tags are detectable by reading the unique identification numbers (for those tags within the detection range of the reader). For example, if the detection range of the RFID reader 640 (e.g., as set by configuring the power level and antenna configuration) is such that the tags are detectable when there are two or more items of product in a row, then the RFID reader 640 will detect the tags of Row 620A and Row 620B, and the tags of 620C and 620D will not be detectable.

The example diagram 600 depicts an single antenna 630 connected to the RFID reader 640. However, in other implementations, the multiple antennas are used (e.g., one for each row).

In another implementation, the RFID reader 640 is connected to a plurality of antennas (e.g., antenna 630), each antenna configured to detect tags on a different shelving unit.

EXAMPLE 13

Exemplary Spring System

Figure 7:
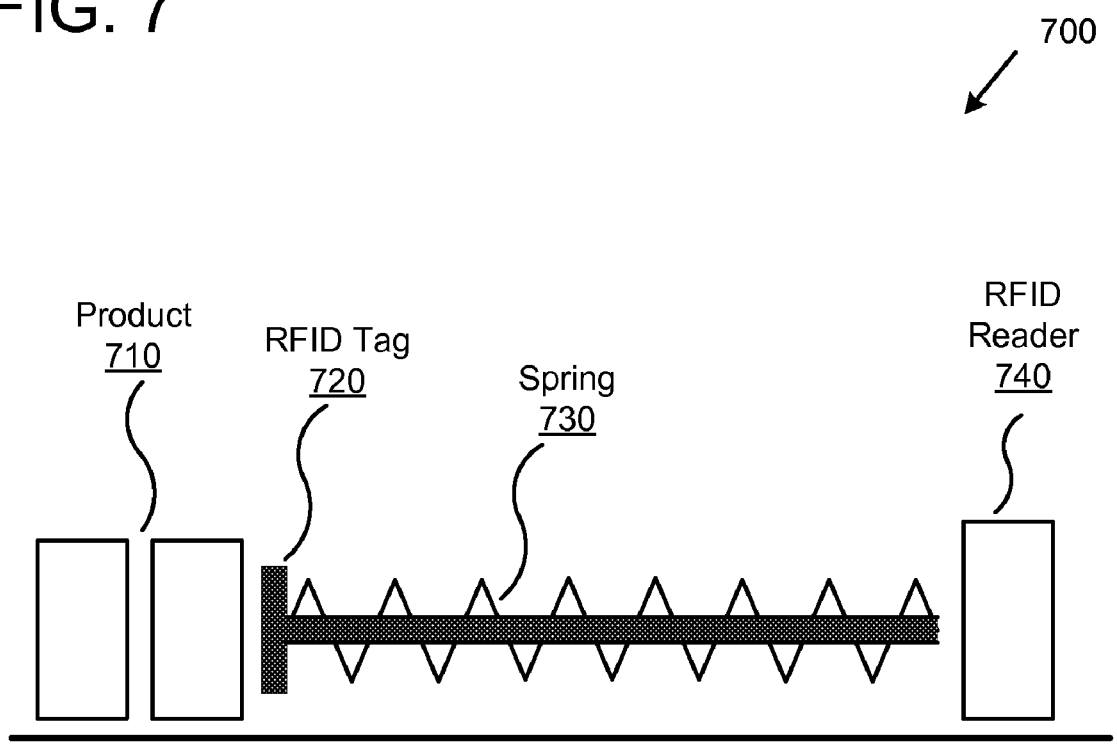
FIG. 7 is a diagram showing a schematic view depicting a spring system.

FIG. 7 is an exemplary diagram 700 showing a schematic view of a spring system for determining whether RFID tags are detectable. In the diagram 700, a RFID tag 720 is connected to a spring 730 (e.g., a spring-loaded pusher). The spring 730 maintains the position of the RFID tag 720 behind (e.g., immediately behind) the product 710. As quantity of product is added, the spring is compressed 730 and the RFID tag 720 moves closer to the RFID reader 740. As quantity of the product is removed, the spring 730 pushes the RFID tag 720 farther from the reader 740.

The spring system can be used for rows of a shelving unit (e.g., the rows of the shelving unit depicted in FIG. 6).

EXAMPLE 14

Exemplary Gravity-Feed System

Figure 8:
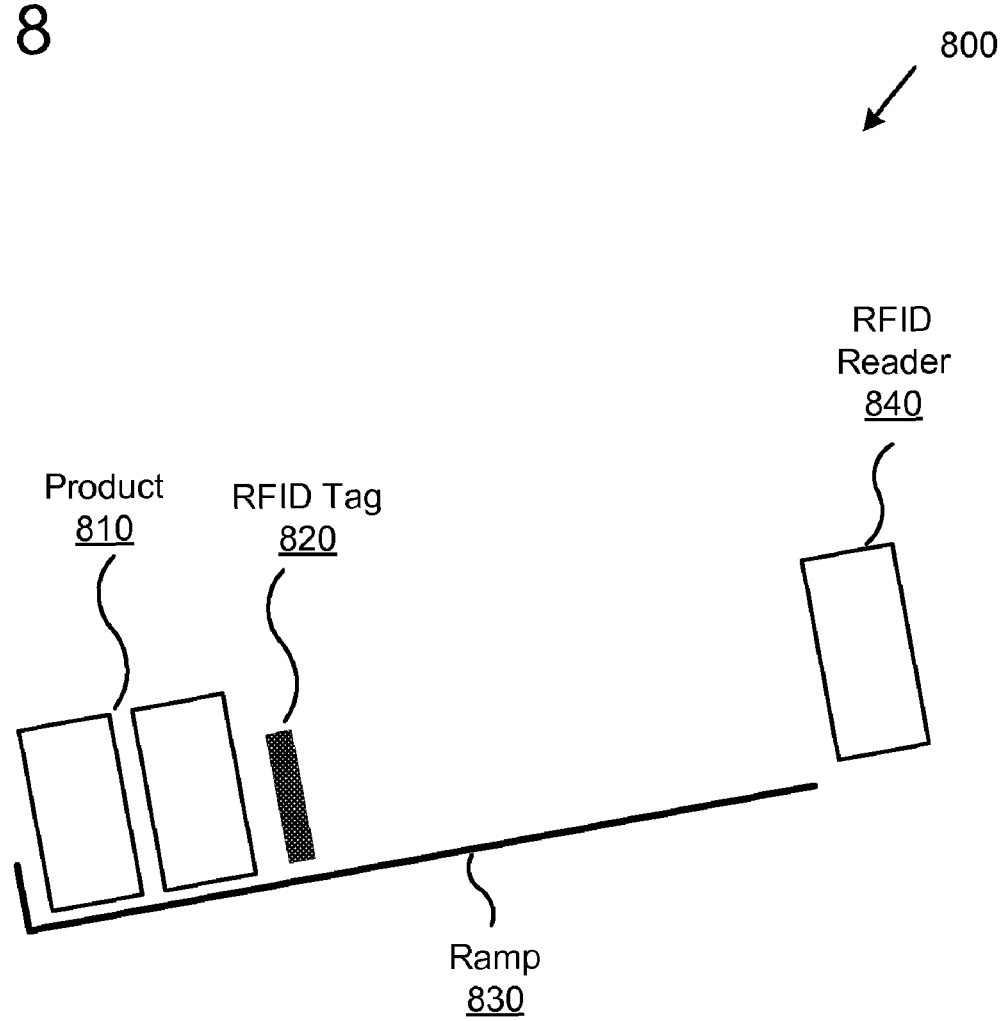
FIG. 8 is a diagram showing a schematic view depicting a gravity-feed system.

FIG. 8 is an exemplary diagram 800 showing a schematic view of a gravity-feed system for determining whether RFID tags are detectable. In the diagram 800, a RFID tag 820 is located behind (e.g., immediately behind) a quantity of a product 810. The product 810 and tag 820 travel along an angled ramp 830 such that gravity pulls the product 810 and tag 820 to the lower end of the ramp (the left-hand side in the diagram 800). An end on the ramp (e.g., a lip or stopper) keeps the product 810 and tag 820 from falling off the end. Product can be added to, or removed from, the front (left-hand side) of the ramp. As product is added to the ramp, the RFID tag 820 moves closer to the RFID reader 840, and as product is removed from the ramp, the RFID tag 820 moves farther from the RFID reader 840.

Depending on the detection range (e.g., a pre-configured detection range) of the RFID reader 840, various product availability conditions can be set. For example, if the detection range is set such that the RFID tag 820 is detectable when there is one or more quantity of the product 810 on the ramp 830, then a product availability condition can be set indicating whether the shelf has at least one quantity of the product or is empty.

EXAMPLE 15

Exemplary Computing Environment

Figure 9:
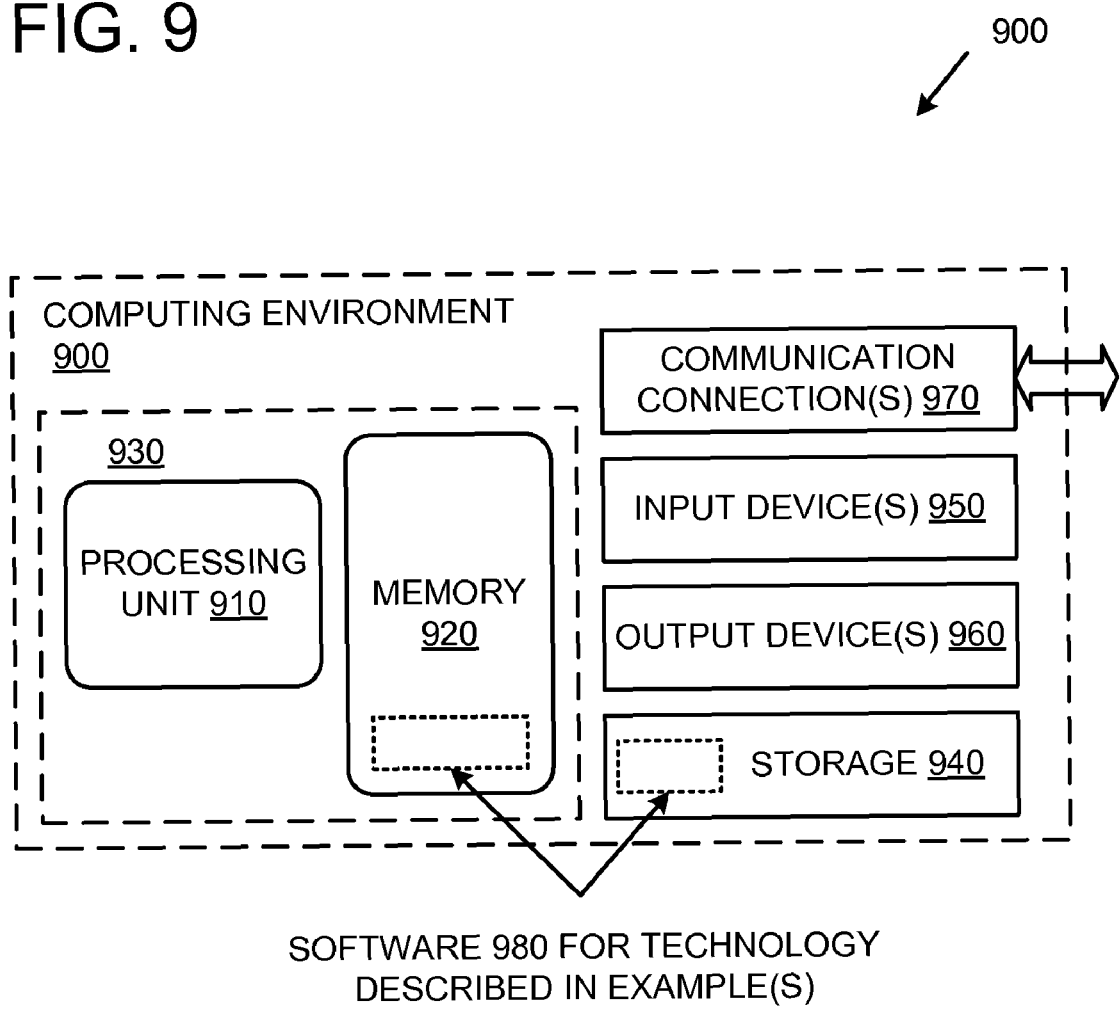
FIG. 9 is a block diagram illustrating an example of a computing environment that can be used to implement any of the technologies described herein.

FIG. 9 illustrates a generalized example of a suitable computing environment 900 in which described embodiments, techniques, and technologies may be implemented. The computing environment 900 is not intended to suggest any limitation as to scope of use or functionality of the technology, as the technology may be implemented in diverse general-purpose or special-purpose computing environments. For example, the disclosed technology may be implemented with other computer system configurations, including hand held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 9, the computing environment 900 includes at least one central processing unit 910 and memory 920. In FIG. 9, this most basic configuration 930 is included within a dashed line. The central processing unit 910 executes computer-executable instructions and may be a real or a virtual processor. In a multi-processing system, multiple processing units execute computer-executable instructions to increase processing power and as such, multiple processors can be running simultaneously. The memory 920 may be volatile memory (e.g., registers, cache, RAM), non-volatile memory (e.g., ROM, EEPROM, flash memory, etc.), or some combination of the two. The memory 920 stores software 980 that can, for example, implement the technologies described herein. A computing environment may have additional features. For example, the computing environment 900 includes storage 940, one or more input devices 950, one or more output devices 960, and one or more communication connections 970. An interconnection mechanism (not shown) such as a bus, a controller, or a network, interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which can be used to store information and which can be accessed within the computing environment 900. The storage 940 stores instructions for the software 980, which can implement technologies described herein.

The input device(s) 950 may be a touch input device, such as a keyboard, keypad, mouse, pen, or trackball, a voice input device, a scanning device, or another device, that provides input to the computing environment 900. For audio, the input device(s) 950 may be a sound card or similar device that accepts audio input in analog or digital form, or a CD-ROM reader that provides audio samples to the computing environment 900. The output device(s) 960 may be a display, printer, speaker, CD-writer, or another device that provides output from the computing environment 900.

The communication connection(s) 970 enable communication over a communication medium (e.g., a connecting network) to another computing entity. The communication medium conveys information such as computer-executable instructions, compressed graphics information, or other data in a modulated data signal.

Computer-readable media are any available media that can be accessed within a computing environment 900. By way of example, and not limitation, with the computing environment 900, computer-readable media include memory 920, storage 940, communication media (not shown), and combinations of any of the above.

EXAMPLE 16

Exemplary Automated Methods

Any of the methods described herein can be performed via one or more computer-readable media (e.g., storage media) having computer-executable instructions for performing such methods. Operation can be fully automatic, semi-automatic, or involve manual intervention.

EXAMPLE 17

Exemplary Combinations

The technologies of any example described herein can be combined with the technologies of any one or more other examples described herein.

EXAMPLE 18

Exemplary Alternatives

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. I therefore claim as my invention all that comes within the scope and spirit of these claims.

I claim:

1. A method, implemented at least in part by a computing device, for determining product availability of products on a product display unit using radio-frequency identification (RFID), the method comprising:
   determining whether a RFID tag is detectable by a RFID reader; and
   based on the determination, setting a product availability condition indicating product availability of a product on the product display unit;
   wherein the RFID tag is associated with the product display unit, wherein the RFID tag is not attached to the product, and wherein distance between the RFID tag and an antenna of the RFID reader changes as quantity of the product on the product display unit changes;
   wherein the RFID tag is movably attached to the product display unit, wherein the RFID tag moves closer to the antenna of the RFID reader as quantity of the product is added to the product display unit, and where the RFID tag moves farther from the antenna of the RFID reader as quantity of the product is removed from the product display unit; and
   wherein as quantity of the product is added to the product display unit, the product pushes the RFID tag closer to the antenna of the RFID reader, and wherein as quantity of the product is removed from the product display unit, the RFID tag is pushed farther from the antenna of the RFID reader.

2. The method of claim 1 wherein the RFID tag is located closer to the antenna of the RFID reader when there is a greater quantity of the product on the product display unit, and wherein the RFID tag is located farther from the antenna of the RFID reader when there is a lesser quantity of product on the product display unit.

3. The method of claim 1 wherein the product availability condition is either no quantity of the product remaining on the product display unit, or one or more quantity of the product remaining on the product display unit.

4. The method of claim 1 wherein the product availability condition is selected from two available product availability conditions:
   less than or equal to a pre-determined quantity of the product remaining on the product display unit; and greater than the pre-determined quantity of product remaining on the product display unit.

5. The method of claim 1 wherein the product is not RFID tagged.

6. The method of claim 1 wherein the RFID tag is detectable by the RFID reader when the RFID tag is located within a pre-configured detection range of the antenna of the RFID reader.

7. The method of claim 6 wherein the pre-configured detection range corresponds to a pre-determined quantity of product on the product display unit.

8. The method of claim 1 further comprising:
when the RFID tag is within detection range of the antenna of the RFID reader, receiving, by the RFID reader from the RFID tag, a unique identification number of the RFID tag.

9. The method of claim 1 wherein the product display unit is a shelving unit, wherein the RFID tag is fixed to a spring-loaded pusher of the shelving unit, and wherein the spring-loaded pusher moves the RFID tag farther from the antenna of the RFID reader as quantity of the product is removed from the shelving unit.

10. The method of claim 1 further comprising:
determining whether one or more other RFID tags are detectable by the RFID reader; and
based on the determination of whether the one or more other RFID tags are detectable, setting one or more other product availability conditions indicating product availability of one or more other products on the product display unit;
wherein the one or more other RFID tags are associated with the product display unit, wherein the one or more other RFID tags are not attached to the one or more other products, and wherein distance between the one or more other RFID tags and the antenna of the RFID reader changes as quantity of the one or more other products on the product display unit changes.

11. A product display system for determining availability of products using radio-frequency identification (RFID), the system comprising:
a product display unit configured to hold a quantity of a product;
a RFID reader;
a RFID tag, wherein the RFID tag is movably attached to the product display unit, wherein distance between the RFID tag and an antenna of the RFID reader changes as quantity of the product on the product display unit changes, and wherein the RFID tag moves closer to the antenna of the RFID reader as quantity of the product is added to the product display unit, and wherein the RFID tag moves farther from the antenna of the RFID reader as quantity of the product is removed from the product display unit; and
a computing device configured to set a product availability condition indicating product availability of the product on the product display unit;
wherein the RFID reader determines whether the RFID tag is detectable by the RFID reader, and wherein the determination depends on whether the RFID tag is within a pre-configured detection range of the antenna of the RFID reader; and
wherein as quantity of the product is added to the product display unit, the product pushes the RFID tag closer to the antenna of the RFID reader, and wherein as quantity of the product is removed from the product display unit, the RFID tag is pushed farther from the antenna of the RFID reader.

12. The system of claim 11 wherein the product availability condition is either no quantity of the product remaining on the product display unit, or one or more quantity of the product remaining on the product display unit.

13. The system of claim 11 wherein the product availability condition is selected from two available product availability conditions:
less than or equal to a pre-determined quantity of the product remaining on the product display unit; and
greater than the pre-determined quantity of product remaining on the product display unit.

14. The system of claim 11 wherein the product availability condition indicates presence or absence of the product on the product display unit.

15. The system of claim 11 wherein the product display unit is a shelving unit, wherein the RFID tag is fixed to a spring-loaded pusher of the shelving unit, and wherein the spring-loaded pusher moves the RFID tag farther from the antenna of the RFID reader as quantity of the product is removed from the shelving unit.

16. The system of claim 11 further comprising:
one or more other RFID tags, each of the one or more other RFID tags being movably attached to the product display unit, wherein distance between the one or more other RFID tags and the antenna of the RFID reader changes as quantity of one or more other products associated with the one or more other RFID tags changes;
wherein the computing device is further configured to set one or more other product availability conditions indicating product availability of the one or more other products, wherein the product display unit is further configured to hold the one or more other products;
wherein the RFID reader determines whether the one or more other RFID tags are detectable by the RFID reader, and wherein the determination depends on whether the one or more other RFID tags are within the pre-configured detection range of the antenna of the RFID reader.

17. The system of claim 16 wherein the one or more other RFID tags move closer to the antenna of the RFID reader as quantity of the one or more other products associated with the one or more other RFID tags is added to the product display unit, and wherein the one or more other RFID tags moves farther from the antenna of the RFID reader as quantity of the one or more other products associated with the one or more other RFID tags is removed from the product display unit.

18. A product display system for determining availability of products on shelving units using radio-frequency identification (RFID), the system comprising:
a shelving unit configured to hold one or more products, wherein the shelving unit is configured in a plurality of rows, each row configured to hold a quantity of product of the one or more products;
a plurality of RFID tags corresponding to the plurality of rows, wherein each RFID tag is located on a different row of the plurality of rows, and wherein each RFID tag travels along its corresponding row;
a RFID reader, wherein the RFID reader determines which of the plurality of RFID tags are detectable by the RFID reader, and wherein the determination depends on whether each RFID tag of the plurality of RFID tags is within a pre-configured detection range of an antenna of the RFID reader; and
a computing device configured to set one or more product availability conditions indicating product availability of the one or more products based on which of the plurality of RFID tags are detectable;

wherein each RFID tag moves closer to the antenna of the RFID reader along its row as quantity of a product of the one or more products is added to the row, and wherein each RFID tag moves farther from the antenna of the RFID reader along its row as quantity of the product is removed from the row; and wherein as quantity of a product of the one or more products is added to a row of the plurality of rows, the product pushes an RFID tag corresponding to the row closer to the antenna of the RFID reader, and wherein as quantity of the product is removed from the row, the RFID tag corresponding to the row is pushed farther from the antenna of the RFID reader.

19. The system of claim 18 wherein the shelving unit is a pre-configured shelving unit that has been pre-configured to hold the one or more products.

20. The system of claim 18 wherein the shelving unit is user-configurable for a plurality of different products.

21. A product display system for determining availability of products using radio-frequency identification (RFID), the system comprising:

a means for holding a quantity of a product;

a RFID reader;

a means for associating a RFID tag with the means for holding the quantity of the product, wherein the RFID tag is not attached to the product, wherein distance between the RFID tag and an antenna of the RFID reader changes as quantity of the product changes, wherein the RFID tag moves closer to the antenna of the RFID reader as quantity of the product is added to the product display system, wherein the RFID tag moves farther from the antenna of the RFID reader as quantity of the product is removed from the product display system, wherein as quantity of the product is added to the product display system, the product pushes the RFID tag closer to the antenna of the RFID reader, and wherein as quantity of the product is removed from the product display system, the RFID tag is pushed farther from the antenna of the RFID reader; and means for setting a product availability condition indicating product availability of the product on the means for holding the quantity of the product.

* * * * *